United States Patent
Kupfer et al.

(10) Patent No.: US 11,220,603 B2
(45) Date of Patent: Jan. 11, 2022

(54) STABILIZERS FOR SILICATE PAINTS

(71) Applicant: Clariant International Ltd., Muttenz (CH)

(72) Inventors: Rainer Kupfer, Hattersheim (DE); Jesús Pitarch López, Frankfurt am Main (DE); Christoph Söffing, Mettmann (DE); Jörg Rüger, Goldbach (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 16/300,025

(22) PCT Filed: Apr. 18, 2017

(86) PCT No.: PCT/EP2017/059115
§ 371 (c)(1),
(2) Date: Nov. 8, 2018

(87) PCT Pub. No.: WO2017/194270
PCT Pub. Date: Nov. 16, 2017

(65) Prior Publication Data
US 2019/0177558 A1   Jun. 13, 2019

(30) Foreign Application Priority Data
May 9, 2016   (DE) .......................... 102016207877.1

(51) Int. Cl.
| | | |
|---|---|---|
| C09D 1/04 | (2006.01) | |
| C09D 7/00 | (2018.01) | |
| C09D 7/63 | (2018.01) | |
| C09D 7/48 | (2018.01) | |
| C08K 5/19 | (2006.01) | |
| C08L 33/10 | (2006.01) | |
| C08L 33/26 | (2006.01) | |
| C09D 5/02 | (2006.01) | |

(52) U.S. Cl.
CPC .................. *C09D 1/04* (2013.01); *C09D 7/00* (2013.01); *C09D 7/48* (2018.01); *C09D 7/63* (2018.01); *C08K 5/19* (2013.01); *C08L 33/10* (2013.01); *C08L 33/26* (2013.01); *C09D 5/025* (2013.01); *C09D 5/027* (2013.01); *C09D 5/028* (2013.01)

(58) Field of Classification Search
CPC .......... C09D 1/04; C09D 5/025; C09D 5/027; C09D 5/028; C09D 7/00; C09D 7/48; C09D 7/63; C08K 5/19; C08L 33/10; C08L 33/26
See application file for complete search history.

(56) References Cited

U.S. PATENT DOCUMENTS

| | | |
|---|---|---|
| 2,016,962 A | 10/1935 | Flint |
| 2,667,478 A | 1/1954 | Schwartz |
| 2,703,798 A | 3/1955 | Schwartz |
| 2,891,052 A | 6/1959 | Boettner |
| 2,982,737 A | 5/1961 | Boettner |
| 2,993,887 A | 7/1961 | Zech |
| 3,002,923 A | 10/1961 | Barker |
| 3,272,795 A | 9/1966 | Heywood |
| 4,079,078 A | 3/1978 | Collins |
| 4,341,559 A * | 7/1982 | Friedemann ............ B22C 1/167 106/162.2 |
| 4,400,196 A | 8/1983 | Albrecht |
| 4,413,087 A | 11/1983 | Bernot |
| 4,481,186 A | 11/1984 | Deckner |
| 4,505,827 A | 3/1985 | Rose |
| 4,565,647 A | 1/1986 | Llenado |
| 4,654,207 A | 3/1987 | Preston |
| 4,681,946 A | 7/1987 | Baur |
| 4,981,684 A | 1/1991 | MacKenzie |
| 5,009,814 A | 4/1991 | Kelkenberg |

(Continued)

FOREIGN PATENT DOCUMENTS

| | | |
|---|---|---|
| BR | 112015009806 | 7/2017 |
| CA | 2117007 | 9/1994 |

(Continued)

OTHER PUBLICATIONS

Plante et al. Castor Oil [online] retrieved on Jan. 13, 2016 from: http://www.dionex.com/en-us/webdocs/110518-PO-UHPLC-Castor-Oil-31May2011-LPN2822-01.pdf; 5 pages.
Bezard (Lipids 1971;6:630-634), (Year:1971).
Hardcopy of http://igf-bingen.de/Croda_produkte.pdf, Dec. 1, 2016. 3 pages.
International Search Report for PCT/EP2013/061075, dated May 15, 2014. 2 pages.
Tan et al. (Appl Microbiol Biotechnol. 47:207-211) (Year: 1997).
Dale et al. (J. Sci. Food. Agric. 1955;6:166-170) (Year: 1955).
Palm fatty acid distillate (PFAD) [online] retrieved on May 21, 2018 from: https://www.neste.com/corporate-info/sustainability/sustainable-supply-chain/pfad-residue-palm-oil-refining-process; 1 page (Year: 2018).

(Continued)

*Primary Examiner* — Anthony J Green
(74) *Attorney, Agent, or Firm* — Tod A. Waldrop

(57) ABSTRACT

The invention relates to a silicate coating containing (A) at least one compound of the formula (I),

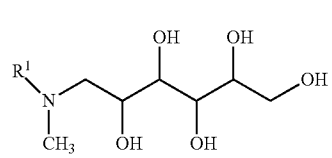

where $R^1$ represents H, $C_1$-$C_4$-alkyl, $CH_2CH_2OH$, or $CH_2CH(CH_3)OH$, (B) at least one silicate binder, (C) if appropriate, one or more polymer binders, (D) if appropriate, further additives usual for the production of silica coatings, and (E) water.

28 Claims, No Drawings

(56) References Cited

U.S. PATENT DOCUMENTS

| | | |
|---|---|---|
| 5,194,639 A | 3/1993 | Connor |
| 5,254,281 A | 10/1993 | Pichardo |
| 5,298,195 A | 3/1994 | Brumbaugh |
| 5,317,047 A | 5/1994 | Sabate |
| 5,354,425 A | 10/1994 | Mackey |
| 5,449,770 A | 9/1995 | Shumate |
| 5,454,982 A | 10/1995 | Murch |
| 5,500,155 A | 3/1996 | Weuthen |
| 5,539,134 A | 7/1996 | Strecker |
| 5,559,078 A | 9/1996 | Garst |
| 5,560,873 A | 10/1996 | Chen |
| 5,625,098 A | 4/1997 | Kao |
| 5,691,299 A | 11/1997 | Fabry |
| 5,711,899 A | 1/1998 | Kawa |
| 5,712,235 A | 1/1998 | Nieendick |
| 5,716,922 A | 2/1998 | Curry |
| 5,725,470 A | 3/1998 | Lazarowitz |
| 5,750,748 A | 5/1998 | Boutique |
| 5,766,267 A | 6/1998 | Schumacher |
| 5,777,165 A | 7/1998 | Kao |
| 5,789,372 A | 8/1998 | Fabry |
| 5,874,096 A | 2/1999 | Hazen |
| 5,945,389 A | 8/1999 | Richard |
| 6,147,045 A | 11/2000 | Lappas |
| 6,147,124 A | 11/2000 | Ansmann |
| 6,165,955 A | 12/2000 | Chen |
| 6,264,961 B1 | 7/2001 | Ansmann |
| 6,274,126 B1 | 8/2001 | Newell |
| 6,288,023 B1 | 9/2001 | Honda |
| 6,329,331 B1 | 12/2001 | Aronson |
| 6,350,788 B1 | 2/2002 | Herold |
| 6,391,962 B2 | 5/2002 | Zerrer |
| 6,455,001 B1 | 9/2002 | Knappe |
| 6,635,708 B1 | 10/2003 | Papenfuhs |
| 6,727,217 B1 | 4/2004 | Nieendick |
| 6,887,838 B2 | 5/2005 | Dykstra |
| 6,903,057 B1 | 6/2005 | Tsaur |
| 7,056,379 B2 | 6/2006 | Nieendick |
| 7,217,752 B2 | 5/2007 | Schmucker-Castner |
| 7,250,392 B1 | 7/2007 | Leonard |
| 7,297,666 B2 | 11/2007 | Kuepper |
| 7,380,606 B2 | 6/2008 | Pursley |
| 7,407,667 B2 | 8/2008 | Zerrer |
| 7,578,995 B2 | 8/2009 | Frantz |
| 7,776,318 B2 | 8/2010 | Bissey-Beugras |
| 7,820,771 B2 | 10/2010 | Lapra |
| 7,872,036 B2 | 1/2011 | Toriyabe |
| 7,897,543 B2 | 3/2011 | Bretschneider |
| 7,998,911 B1 | 8/2011 | Berger |
| 8,084,452 B2 | 12/2011 | Jeschke |
| 8,178,481 B2 | 5/2012 | Sans |
| 8,220,564 B2 | 7/2012 | Runquist |
| 8,263,538 B2 | 9/2012 | Tsaur |
| 8,324,390 B2 | 12/2012 | Fischer |
| 8,404,855 B2 | 3/2013 | Jeschke |
| 8,536,340 B2 | 9/2013 | Hamamoto |
| 8,637,432 B2 | 1/2014 | Baur |
| 8,729,323 B2 | 5/2014 | Kothandaraman |
| 8,759,255 B2 | 6/2014 | Wacker |
| 8,809,547 B2 | 8/2014 | Bretschneider |
| 8,901,041 B2 | 12/2014 | Frisch |
| 9,187,407 B2 | 11/2015 | Koshti |
| 9,504,636 B2 | 11/2016 | Klug |
| 9,949,909 B2 | 4/2018 | Klug |
| 10,172,774 B2 | 1/2019 | Klug |
| 10,265,253 B2 | 4/2019 | Klug |
| 2001/0023298 A1 | 9/2001 | Weinelt |
| 2001/0056048 A1 | 12/2001 | Bertolosso |
| 2002/0004476 A1 | 1/2002 | Pancheri |
| 2002/0040662 A1 | 4/2002 | Dietz |
| 2002/0065198 A1 | 5/2002 | Highsmith |
| 2002/0168417 A1 | 11/2002 | Blease |
| 2003/0004929 A1 | 1/2003 | Julian |
| 2003/0049292 A1 | 3/2003 | Turowski-Wanke |
| 2003/0069153 A1 | 4/2003 | Jordan |
| 2003/0199403 A1 | 10/2003 | Wells |
| 2004/0086470 A1 | 5/2004 | Nieendick |
| 2005/0037926 A1 | 2/2005 | Zerrer |
| 2005/0037942 A1 | 2/2005 | Otterson |
| 2005/0084466 A1 | 4/2005 | Mullay |
| 2005/0172859 A1 | 8/2005 | Nieendick |
| 2005/0233935 A1 | 10/2005 | Gunn |
| 2006/0058205 A1 | 3/2006 | Ainger |
| 2006/0079414 A1 | 4/2006 | Nieendick |
| 2006/0089294 A1 | 4/2006 | Depoot |
| 2006/0100127 A1* | 5/2006 | Meier ............... A61Q 5/12 510/499 |
| 2006/0110415 A1 | 5/2006 | Gupta |
| 2006/0110432 A1 | 5/2006 | Luu |
| 2006/0135382 A1 | 6/2006 | Molenda |
| 2006/0142291 A1 | 6/2006 | Beilfuss |
| 2006/0166826 A1 | 7/2006 | Zerrer |
| 2006/0171979 A1 | 8/2006 | Calvo |
| 2007/0054820 A1 | 3/2007 | Harichian |
| 2007/0060489 A1 | 3/2007 | Sun |
| 2007/0110700 A1 | 5/2007 | Wells |
| 2007/0128144 A1 | 6/2007 | Bonastre Gilabert |
| 2007/0190004 A1 | 8/2007 | Bockmuhl |
| 2007/0213226 A1 | 9/2007 | Sieverding |
| 2008/0057014 A1 | 3/2008 | Masuda |
| 2008/0317960 A1 | 12/2008 | Pitt |
| 2009/0023622 A1 | 1/2009 | Leidreiter |
| 2009/0042749 A1* | 2/2009 | Meier ............... A61Q 19/10 507/209 |
| 2009/0111847 A1 | 4/2009 | Li |
| 2009/0118152 A1 | 5/2009 | Lam |
| 2009/0124498 A1 | 5/2009 | Von Deyn |
| 2009/0253612 A1 | 10/2009 | Mushock |
| 2009/0257972 A1 | 10/2009 | Dieker |
| 2010/0051200 A1 | 3/2010 | Mueller |
| 2010/0285077 A1 | 11/2010 | Lintner |
| 2010/0326320 A1 | 12/2010 | Swedo |
| 2011/0002865 A1 | 1/2011 | Fournial |
| 2011/0146536 A1 | 6/2011 | Tomlinson |
| 2011/0150786 A1 | 6/2011 | Desenne |
| 2011/0152150 A1 | 6/2011 | Bernard |
| 2011/0177945 A1 | 7/2011 | Klingelhoefer |
| 2011/0251116 A1 | 10/2011 | Aehle |
| 2011/0263471 A1 | 10/2011 | Barnhart |
| 2012/0009127 A1 | 1/2012 | Dasgupta |
| 2012/0010113 A1 | 1/2012 | Hee |
| 2012/0070388 A1 | 3/2012 | Man |
| 2012/0073817 A1 | 3/2012 | Van Zanten |
| 2012/0094890 A1 | 4/2012 | Anantaneni |
| 2012/0172223 A1 | 7/2012 | Wacker |
| 2012/0244092 A1 | 9/2012 | Moser |
| 2013/0030197 A1 | 1/2013 | Harichian |
| 2013/0189212 A1 | 7/2013 | Jawale |
| 2013/0216491 A1 | 8/2013 | Ogihara |
| 2014/0096969 A1 | 4/2014 | Ali |
| 2014/0121285 A1 | 5/2014 | Baur |
| 2014/0135245 A1 | 5/2014 | Annaheim |
| 2014/0230841 A1 | 8/2014 | Mathonneau |
| 2014/0255330 A1 | 9/2014 | Cron |
| 2014/0303389 A1 | 10/2014 | Crosby |
| 2014/0335049 A1 | 11/2014 | Morein |
| 2015/0032003 A1 | 1/2015 | Cho |
| 2015/0125415 A1 | 5/2015 | Klug |
| 2015/0126424 A1 | 5/2015 | Klug |
| 2015/0126616 A1 | 5/2015 | Klug |
| 2015/0133560 A1 | 5/2015 | Klug |
| 2015/0140048 A1 | 5/2015 | Klug |
| 2015/0141466 A1 | 5/2015 | Klug |
| 2015/0141508 A1 | 5/2015 | Klug |
| 2015/0150767 A1 | 6/2015 | Klug |
| 2015/0164755 A1 | 6/2015 | Klug |
| 2015/0164756 A1 | 6/2015 | Klug |
| 2015/0282478 A1 | 10/2015 | Baur |
| 2015/0320037 A1 | 11/2015 | Wacker |
| 2015/0335550 A1 | 11/2015 | Koshti |
| 2016/0074310 A1 | 3/2016 | Klug |
| 2016/0136072 A1 | 5/2016 | Klug |
| 2016/0143828 A1 | 5/2016 | Klug |
| 2016/0243014 A1 | 8/2016 | Dahms |

(56) References Cited

U.S. PATENT DOCUMENTS

| | | |
|---|---|---|
| 2016/0272666 A1 | 9/2016 | Klug |
| 2016/0361243 A1 | 12/2016 | Klug |
| 2017/0000710 A1 | 1/2017 | Klug |
| 2017/0002297 A1 | 1/2017 | Klug |
| 2017/0044434 A1 | 2/2017 | Baur |
| 2017/0055524 A1 | 3/2017 | Baur |
| 2017/0071199 A1 | 3/2017 | Baur |
| 2017/0101606 A1 | 4/2017 | Klug |
| 2017/0218293 A1 | 8/2017 | Klug |
| 2017/0226349 A1* | 8/2017 | Kupfer ............... C09D 5/027 |
| 2017/0265477 A1 | 9/2017 | Baur |
| 2017/0292062 A1 | 10/2017 | Wylde |
| 2017/0305838 A1 | 10/2017 | Appel |
| 2018/0215879 A1 | 8/2018 | Kupfer |
| 2018/0291208 A1* | 10/2018 | Kupfer ............... C09C 1/24 |
| 2019/0076344 A1 | 3/2019 | Klug |

FOREIGN PATENT DOCUMENTS

| | | |
|---|---|---|
| CA | 1333226 | 11/1994 |
| CA | 2127644 | 1/1995 |
| CN | 1061960 | 6/1992 |
| CN | 1077489 | 10/1993 |
| CN | 1078746 | 11/1993 |
| CN | 1088258 | 6/1994 |
| CN | 1140987 | 1/1997 |
| CN | 1141653 | 1/1997 |
| CN | 1155239 | 7/1997 |
| CN | 1184417 A | 6/1998 |
| CN | 1292641 | 4/2001 |
| CN | 1296524 | 5/2001 |
| CN | 1501772 | 6/2004 |
| CN | 1518408 | 8/2004 |
| CN | 1594518 | 3/2005 |
| CN | 1997341 | 7/2007 |
| CN | 101056959 A | 10/2007 |
| CN | 100528887 C | 8/2009 |
| CN | 102186340 | 9/2011 |
| CN | 102595882 | 7/2012 |
| CN | 103468362 | 12/2013 |
| CN | 103468382 | 12/2013 |
| CN | 104918490 | 9/2015 |
| DE | 1956509 | 5/1971 |
| DE | 2226872 A1 | 12/1973 |
| DE | 4238211 | 1/1994 |
| DE | 4235783 | 4/1994 |
| DE | 4435383 | 11/1995 |
| DE | 19507531 | 9/1996 |
| DE | 19701127 | 7/1998 |
| DE | 19808824 | 10/1999 |
| DE | 19846429 | 4/2000 |
| DE | 19916090 | 10/2000 |
| DE | 10117993 | 10/2002 |
| DE | 10130357 | 1/2003 |
| DE | 102007034438 | 1/2009 |
| DE | 202013011412 | 1/2014 |
| DE | 202013011413 | 1/2014 |
| DE | 102012021647 | 5/2014 |
| DE | 202014008415 U1 | 11/2014 |
| DE | 202014008418 U1 | 11/2014 |
| DE | 202014008420 U1 | 12/2014 |
| DE | 102014017368 A1 | 5/2015 |
| EP | 0039860 | 11/1981 |
| EP | 0048436 | 3/1982 |
| EP | 0285768 | 10/1988 |
| EP | 0285786 | 10/1988 |
| EP | 0336151 | 10/1989 |
| EP | 0378985 | 7/1990 |
| EP | 0407874 | 1/1991 |
| EP | 0412849 A2 | 2/1991 |
| EP | 0539588 | 5/1993 |
| EP | 0550637 | 7/1993 |
| EP | 0572723 | 12/1993 |
| EP | 0614881 | 9/1994 |
| EP | 0633244 | 1/1995 |
| EP | 0709449 | 5/1996 |
| EP | 0745719 | 12/1996 |
| EP | 0769548 A1 | 4/1997 |
| EP | 0774503 A1 | 5/1997 |
| EP | 0995994 | 4/2000 |
| EP | 1043017 | 10/2000 |
| EP | 1078978 | 2/2001 |
| EP | 1093722 | 4/2001 |
| EP | 1110944 | 6/2001 |
| EP | 1177223 | 2/2002 |
| EP | 1379129 | 1/2004 |
| EP | 1422288 | 5/2004 |
| EP | 1529832 | 5/2005 |
| EP | 1676831 | 7/2006 |
| EP | 1716842 | 11/2006 |
| EP | 1869978 A1 | 12/2007 |
| JP | S4810053 B | 2/1973 |
| JP | S63270534 | 11/1988 |
| JP | H06501731 | 2/1994 |
| JP | H06501733 | 2/1994 |
| JP | H06240599 | 8/1994 |
| JP | H07507341 | 8/1995 |
| JP | H0812993 | 1/1996 |
| JP | H0848618 | 2/1996 |
| JP | H09502476 | 3/1997 |
| JP | H09506683 | 6/1997 |
| JP | H09510956 | 11/1997 |
| JP | H10501279 | 2/1998 |
| JP | H10508043 | 8/1998 |
| JP | H11505839 | 5/1999 |
| JP | H11246890 | 9/1999 |
| JP | H11512334 | 10/1999 |
| JP | 2000512286 | 9/2000 |
| JP | 2000297028 | 10/2000 |
| JP | 2001501635 | 2/2001 |
| JP | 2001131579 | 5/2001 |
| JP | 2001247528 | 9/2001 |
| JP | 2002542344 A | 12/2002 |
| JP | 2006183030 | 7/2006 |
| JP | 2006183039 | 7/2006 |
| JP | 2007538023 | 12/2007 |
| JP | 2008110953 | 5/2008 |
| JP | 2010018586 | 1/2010 |
| JP | 2010037252 | 2/2010 |
| JP | 2013534232 | 9/2013 |
| JP | 2014532815 | 12/2014 |
| JP | 2015518026 | 6/2015 |
| JP | 2017526776 | 9/2017 |
| KR | 100862502 B1 | 10/2008 |
| WO | 9205764 A1 | 4/1992 |
| WO | 9206073 | 4/1992 |
| WO | 9206154 | 4/1992 |
| WO | 9206158 A1 | 4/1992 |
| WO | 9206161 A1 | 4/1992 |
| WO | 9206162 A1 | 4/1992 |
| WO | 9318125 | 9/1993 |
| WO | 9319149 | 9/1993 |
| WO | 9410130 | 5/1994 |
| WO | 9412608 | 6/1994 |
| WO | 9412609 | 6/1994 |
| WO | 9419941 | 9/1994 |
| WO | 9516824 | 6/1995 |
| WO | 9517880 A1 | 7/1995 |
| WO | 9519415 | 7/1995 |
| WO | 9523840 | 9/1995 |
| WO | 9533033 | 12/1995 |
| WO | 9533035 | 12/1995 |
| WO | 9603974 A1 | 2/1996 |
| WO | 9610386 | 4/1996 |
| WO | 9614374 | 5/1996 |
| WO | 9616540 | 6/1996 |
| WO | 9616540 A1 | 6/1996 |
| WO | 9628023 | 9/1996 |
| WO | 9637589 | 11/1996 |
| WO | 9637592 | 11/1996 |
| WO | 9747284 A1 | 12/1997 |
| WO | 9800496 A1 | 1/1998 |
| WO | 9841601 | 9/1998 |
| WO | 9856496 | 12/1998 |

(56) References Cited

FOREIGN PATENT DOCUMENTS

| | | |
|---|---|---|
| WO | 9951716 | 10/1999 |
| WO | 0065014 | 11/2000 |
| WO | 0137658 | 5/2001 |
| WO | 0160877 | 8/2001 |
| WO | 02089575 | 11/2002 |
| WO | 2002096882 | 12/2002 |
| WO | 03000055 | 1/2003 |
| WO | 2003106457 | 12/2003 |
| WO | 2004056358 | 7/2004 |
| WO | 2004099150 | 11/2004 |
| WO | 2004099160 | 11/2004 |
| WO | 2005035486 | 4/2005 |
| WO | 2005063094 | 7/2005 |
| WO | 2005077934 | 8/2005 |
| WO | 2005117580 | 12/2005 |
| WO | 2006043635 | 4/2006 |
| WO | 2006056433 | 6/2006 |
| WO | 2006089633 | 8/2006 |
| WO | 2006100288 | 9/2006 |
| WO | 2007040280 | 4/2007 |
| WO | 2007057407 | 5/2007 |
| WO | 2007075459 | 7/2007 |
| WO | 2007101369 | 9/2007 |
| WO | 2007115643 | 10/2007 |
| WO | 2007115644 | 10/2007 |
| WO | 2007115646 | 10/2007 |
| WO | 2007141066 A1 | 12/2007 |
| WO | 2007147500 | 12/2007 |
| WO | 2007149134 | 12/2007 |
| WO | 2005085216 | 1/2008 |
| WO | 2008009360 | 1/2008 |
| WO | 2008066153 | 6/2008 |
| WO | 2008067911 | 6/2008 |
| WO | 2008104503 | 9/2008 |
| WO | 2009002956 | 12/2008 |
| WO | 2009029561 | 3/2009 |
| WO | 2009049851 | 4/2009 |
| WO | 2009158478 | 12/2009 |
| WO | 2010005692 | 1/2010 |
| WO | 2010006713 | 1/2010 |
| WO | 2010069502 | 6/2010 |
| WO | 2010074747 | 7/2010 |
| WO | 2010074751 | 7/2010 |
| WO | 2010126657 | 11/2010 |
| WO | 2010138661 | 12/2010 |
| WO | 2011138450 A2 | 11/2011 |
| WO | 2012061991 | 5/2012 |
| WO | 2012116939 | 9/2012 |
| WO | 2013016270 A1 | 1/2013 |
| WO | 2013178668 | 12/2013 |
| WO | 2013178670 | 12/2013 |
| WO | 2013178670 A2 | 12/2013 |
| WO | 2013178671 | 12/2013 |
| WO | 2013178679 | 12/2013 |
| WO | 2013178697 | 12/2013 |
| WO | 2013178700 | 12/2013 |
| WO | 2013178701 | 12/2013 |
| WO | 2014056561 A1 | 4/2014 |
| WO | 2014067663 | 5/2014 |
| WO | 2014067663 A1 | 5/2014 |
| WO | 2014170025 | 10/2014 |
| WO | 2015082062 | 6/2015 |
| WO | 2015124302 | 8/2015 |
| WO | 2016023693 | 2/2016 |
| WO | 2016041823 | 3/2016 |
| WO | 2016050782 A1 | 4/2016 |

OTHER PUBLICATIONS

Quack, et al., Fette-Seifen-Anstrichmittel 78, 200(1976). 7 pages.
International Search Report for PCT/EP2013/061076, dated May 15, 2014, 20 pages.
English Translation of Cited Excerpts of CN103468382A, Dec. 25, 2013. 2 pages.
Friedrich Vogel: "Kosmetik aus der Sicht des Chemikers", Chemie in Unserer Zeit, No. 5, Jan. 1, 1986, pp. 156-164, XP055109030, DOI: 10.1002/ciuz.19860200504, p. 160.
International Preliminary Report on Patentability for PCT/EP2013/061044, dated Feb. 12, 2014. 7 pages.
International Preliminary Report on Patentability for PCT/EP2014/001723, dated Jun. 8, 2015. 16 pages.
International Preliminary Report on Patentability for PCT/EP2015/000443, dated Jan. 22, 2016. 6 pages.
International Preliminary Report on Patentability for PCT/EP2015/076072, dated May 16, 2017. 5 pages.
International Search Report for PCT/EP2013/061044, dated May 15, 2014. 2 pages.
International Search Report for PCT/EP2013/061047, dated May 22, 2014. 3 pages.
International Search Report for PCT/EP2013/061100, dated Jul. 16, 2014. 4 pages.
International Search Report for PCT/EP2013/061100, dated Jul. 15, 2014. 4 pages.
International Search Report for PCT/EP2014/001723, dated Jan. 5, 2015. 3 pages.
International Search Report for PCT/EP2015/000443, dated Jun. 2, 2015. 2 pages.
International Search Report for PCT/EP2015/000871 dated Jul. 15, 2015. 3 pages.
International Search Report for PCT/EP2015/076072, dated Feb. 29, 2016. 2 pages.
Lichtenthaler, F.W., "Carbohydrates as Organic Raw Materials," in Ullmann's Encyclopedia of Industrial Chemistry, Wiley-VCH Verlag, 2010. (34 pages).
PubChem, Methylmeglumine, 2006. (Year: 2006) 9 pages.
R. Mohammadi, J. Wassink, A. Amirfazli, "Effect of Surfactants on Wetting of Super-Hydrophobic Surfaces", Langmuir, American Chemical Society, (Oct. 1, 2004), vol. 20, No. 22, doi:10.1021/la049268k, ISSN 07437463, pp. 9657-9662, XP055098502, (Year: 2004).
Smith, J.T. et al., "Micellar Electrokinetic Capillary Chromatography with in Situ Charged Micelles. 1. Evaluation of N-D-Gluco-N-methylalkanamide Surfactants as Anionic Borate Complexes," Anal. Chem. 1994, 66, 1119-1133.
Söderlind, E. et al., "The usefulness of sugar surfactants as solubilizing agents in parenteral formulations," Elsevier, I nternational IJournal of Pharmaceutics 252 (2003) pp. 61-71, Aug. 19, 2002.
Study on Synthesis and Properties of "Green" Surfactants—Glucamine derivates, Zhao Handong, Master Thesis, Southern Yangtze University, pp. 5-6, Jul. 25, 2007.
Tegeler, T. et al., Special Guest Editor Section: Electrically Driven Microseparation Methods for Pesticides and Metabolites: I. Micellar Electrokinetic Capillary Chromatography of Carbamate Insecticides with MEGA-Borate and SDS Surfactants, Journal of AOAC International, vol. 82, No. 6, pp. 1542-1549, Nov. 6, 1999.
The Chemistry of Coconut Oil, accessed online Jul. 12, 2018 (Year: 2018) 5 pages.
V. Bergeron, P. Cooper, C. Fischer. J. Giermanska-Kahn, D. Langevin, and A. Pouchelon, "Polydimethylsiloxane (PDMS)-based antifoams" Colloids and Surfaces A: Physicochemical and Engineering Aspects 122 (1997) 103-120. 18 pages.
Walter, A.; Suchy, S.E.; Vinson, P.K., "Solubility properties of the alkylmethylglucamide surfactants", Biochimica et Biophysica Acta (BBA)—Biomembranes, Elsevier, Amsterdam, NL, Amsterdam, NL, (Nov. 2, 1990), vol. 1029, No. 1, doi:10.1016/0005-2736(90)90437-S, ISSN 0005-2736, pp. 67-74, XP023354648, (Year: 1990).
Zhu, Y-P, et al., "Surface Properties of N-Alkanoyl-N-Methy Glucamines and Related Materials", J. of Surfactants and Detergents, vol. 2, No. 3, Jul. 1, 1999. 6 pages.
International Search Report for PCT/EP2013/003290, dated Feb. 10, 2014. 5 pages.
"Product Specification: N-octanoyl-N-methylglucamine",Jun. 29, 2000 (Jun. 29, 2000), pp. 1-1, XP055098500, Retrieved from the Internet: URL:http://www.sigmaaldrich.com/Graphics/COfAInfo/SigmaSAPQM/SPEC/03/03129/03129-BULKSIGMA.pdf.
International Search Report for PCT/EP2014/001722, dated Jan. 5, 2015. 3 pages.

(56) References Cited

OTHER PUBLICATIONS

Synergen OS Innovation Spotlight, Sep. 1, 2013, 5 pages.
International Search Report for PCT/EP2015/072453, dated Oct. 23, 2015. 2 pages.
International Search Report for PCT/EP2016/063433, dated Aug. 24, 2016. 2 pages.
International Preliminary Report on Patentability for PCT/EP2016/071750, Apr. 10, 2018, 5 pages.
European Coatings Journal in 2009, vol. 07, pp. 26-28.
International Search Report for PCT/EP2016/071750, dated Jan. 28, 2017, 3 pages.
International Search Report for PCT/EP2016/074085, dated Jan. 3, 2017, 3 pages.
"Phase behavior studies of quaternary systems containing N-lauroyl-N-methylglucamide/alcohol/alkane/water", Yang et. al., Journal of Colloid and Interface Science, Academic Press, New York, NY, US, vol. 320, No. 1, Feb. 19, 2008, pp. 283-289 (Year: 2008).
Anan Yaghmur et al., Langmuir, vol. 19, No. 4, pa 1063-1068, Feb. 1, 2003.
Bouton et al, Langmuir, vol. 26, No. 11, pp. 7962-7966, Jun. 1, 2010.
Eliana Areanas et al: Langmuir, vol. 12, No. 2, pp. 588-590, Jan. 1, 1996.
Gregory J. McFann et al, Langmuir, vol. 9, No. 11, pp. 2942-2948, Nov. 1, 1993.
Howard, et al., "Comparison of Flowback Aids: Understanding Their Capillary Pressure and Wetting Properties", SPE Paper 122307, 2009, 16 pages.
International Preliminary Report on Patentability for PCT/EP2015/070567, dated Dec. 23, 2016, 12 pages.
International Search Report for PCT/EP2015/070567, dated Mar. 22, 2016, 5 pages.
Panga, et al., "Wettability Alteration for Water-Block Prevention in High-Prevention in High-Temperature Gas Wells", SPE Paper 100182, 2006, 13 pages.
Penny, et al., "Field Studies of Drilling and Completion Fluids to Minimize Damage and Enhance Gas Production in Unconventional Reservoirs", SPE Paper 107844, 2007, 11 pages.
Pursley, et al., "Microemulsion Additive Enable Optimized Formation Damage Repair and Prevention" Paper 86556, 2004, SPE, 7 pages.
Quintero, et al., "Proper Design Criteria of Microemulsion Treatment fluids for Enhancing Well Production", SPE 144451, 2012, 10 pages.
Rickman, et al., "Optimizing Microemulsion/surfactant Packages for Shale and Tight-Gas Reservoirs", Paper 131107, 2010, SPE, 7 pages.
S. Ray et al., Langmuir, vol. 10, No. 8, pp. 2511-2515, Aug. 1, 1994.
S.Ezrahi et al., Journal of Colloid and Interface Science, vol. 191, No. 2, pp. 277-290, Jul. 1, 1997.
Harada, Shigeharu, and Hideko Sahara. "Volumetric behavior of micellization of acyl-N-methylglucamide surfactants in water." Langmuir 10.11 (1994): 4073-4076. (Year: 1994).
English abstract for WO 01/37658, May 31, 2001, 1 page.
International Preliminary Report on Patentability for App. No. PCT/EP2015/000370, dated Sep. 1, 2016, 12 pages.
International Preliminary Report on Patentability for App. No. PCT/EP2015/000838, dated Oct. 27, 2016, 8 pages.
International Preliminary Report on Patentability for App. No. PCT/EP2017/059115, dated Apr. 16, 2018, 6 pages.
International Search Report for App. No. PCT/EP2019/050825, dated Feb. 25, 2019, 4 pages.
The Pesticide Manual from the British Crop Protection Council, 16th Edition 2012, editor: C. MacBean, 2 pages.
"Compendium of Herbicide Adjuvants" (www.herbicide-adjuvants.com, 2014) PPP-115, WS-54, 76 pages.
Bayer CropScience, Material Safety Data Sheet, nonionic surfactants that are used in commercial formulations (e.g. Liberty®, from Bayer, EPA Reg. No. 264-829) 2011, 9 pages.
Teske et al., 2004, The Role of Small Droplets in Classifying Drop Size Distributions, ILASS Americas 17th Annual Conference, Arlington VA, 8 pages.
Vermeer et al., "The use of adjvanted formulations fordrift control", Proc. ISAA 2013, pp. 323-329, 7 pages.

\* cited by examiner

STABILIZERS FOR SILICATE PAINTS

The present invention relates to stabilizers for silicate paints and dispersion-based silicate paints, these stabilizers reducing the thixotropy and viscosity of the paints.

Silicate paints, including dispersion-based silicate paints, which according to DIN 18363 may contain up to 5 wt % organic fraction, and also organosilicate paints with >5 wt % organic fraction, are enjoying increasing interest because their high pH means that little or no biocides are needed. According to the prior art, aqueous silicate paints and dispersion-based silicate paints use stabilizers which prevent the premature silification of the waterglass in the can, meaning that the coating does not gel during storage, and remains suitable for application.

WO 9418277 describes fumed silica with a surface modified by surfactants, allowing it to be used as a rheological additive and thickener. Surfactants especially suitable for this purpose are tertiary and quaternary alkylamines, including their alkoxylates and dimers.

WO 0073237 and EP 1222234 both describe a silicatic coating stabilized using quaternary bishydroxylammonium salt.

EP 1431354 teaches tertiary diamines as stabilizers for waterglass systems.

DE 102006045853 teaches compositions of silicate-containing formulations consisting of nitrogen-containing compounds and alkyl siliconates, which exhibit improved stabilization of viscosity.

S. Weber (Farbe and Lacke, 2007, vol. 5, pp. 173-174) teaches that technically prized stabilizers or silicate and organosilicate paints are based on quaternary ammonium compounds and amine derivatives. S. Weber emphasizes in particular that a combination of two stabilizers results in reduced thickening during storage.

EP 0614881, U.S. Pat. Nos. 5,449,770 and 2,016,962 describe methods for preparing glucamines starting from glucose.

EP 1676831 gives a general description of the preparation of tertiary dialkylglucamines such as diethylglucamine and the use thereof as surfactant in aqueous coatings, but without reciting any specific example.

The silicatic coatings described according to the prior art have a high thixotropy in practice, which makes handling more difficult to the user, since the coating appears like blancmange. Before being used, therefore, silicate paints, including dispersion-based silicate paints, must be stirred up vigorously in order to disrupt the thixotropy and to make the paints flowable, allowing the paint to be applied uniformly and generating better leveling. Furthermore, silicatic coatings typically exhibit a strong tendency to thicken during storage, a phenomenon resolved only partly by the prior-art solutions.

It was an object of the present invention, therefore, to find stabilizers for silicate paints, including dispersion-based silicate paints, that reduce the viscosity and thixotropy in order to improve operation with and applicability of silicate and dispersion-based silicate paints, and also to improve their shelf life.

Surprisingly it has been found that this is possible with amines based on the renewable raw material glucose.

A subject of the invention is therefore a silicatic coating comprising
(A) at least one compound of the formula (I)

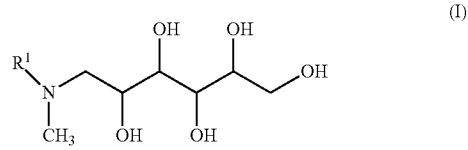

in which $R^1$ is H, $C_1$-$C_4$ alkyl, $CH_2CH_2OH$ or $CH_2CH(CH_3)OH$,
(B) at least one silicate binder,
(C) optionally one or more polymeric binders,
(D) optionally further additives customary in the production of silicatic coatings, and
and
(E) water.

Compound (I) is a polyhydroxyamine wherein $R^1$ may be H, $C_1$-$C_4$ alkyl, $CH_2CH_2OH$ or $CH_2CH(CH_3)OH$. With preference $R^1$ is H, methyl or $CH_2CH_2OH$.

With preference $R^1$ is H, methyl or $CH_2CH_2OH$.

The polyhydroxy unit is a hexose, preferably the epimer glucose.

The process for preparing the alkylglucamines of the formula (I) is well known to the skilled person. For compounds with $R=C_1$ to $C_4$ alkyl, for example, it is accomplished in accordance with the method specified in EP 1676831, by reductive alkylation of N-alkylpolyhydroxylamines with aldehydes or ketones in the presence of hydrogen and a transition metal catalyst. Hydroxyethyl- and hydroxypropyl-N-methyl-glucamine may be prepared by reaction of N-methylglucamine with ethylene oxide and propylene oxide, respectively, in aqueous solution. The compounds of the formula (I) can be used as pure substances or in the form of aqueous solutions. Since the tertiary amines, such as dimethylglucamine, hydroxyethyl- and hydroxypropyl-N-methyl-glucamine, are not very susceptible to the formation of nitrosamines, they are preferred for the silicatic coatings of the invention.

The silicate binder, component (B), preferably comprises precipitated alkali metal silicates, waterglasses or silica sols.

Polymeric binders, component (C), are preferably homo- or copolymers of olefinically unsaturated monomers. Examples of preferred olefinically unsaturated monomers are
  vinyl monomers, such as carboxylic esters of vinyl alcohol, examples being vinyl acetate, vinyl propionate, vinyl ethers of isononanioc acid or of isodecanoic acid, which are also referred to as $C_9$ and $C_{10}$ Versatic acids,
  aryl-substituted olefins, such as styrene and stilbene,
  olefinically unsaturated carboxylic esters, such as methyl acrylate, ethyl acrylate, propyl acrylate, n-butyl acrylate, isobutyl acrylate, pentyl acrylate, hexyl acrylate, 2-ethylhexyl acrylate, tridecyl acrylate, stearyl acrylate, hydroxyethyl acrylate, hydroxypropyl acrylate, and also the corresponding methacrylic esters,
  olefinically unsaturated dicarboxylic esters, such as dimethyl maleate, diethyl maleate, dipropyl maleate, dibutylmaleate, dipentyl maleate, dihexyl maleate, and di-2-ethylhexyl maleate,
  olefinically unsaturated carboxylic acids and dicarboxylic acids, such as acrylic acid, methacrylic acid, itaconic acid, maleic acid, and fumaric acid, and their sodium, potassium and ammonium salts, olefinically unsaturated sulfonic acids and phosphonic acids and their alkali metal and ammonium salts, such as vinylsulfonic acid, vinylphosphonic acid, acrylamidomethylpropanesulfonic acid and its alkali metal and ammonium, alkylammonium, and hydroxyalkylammonium salts, allylsulfonic acid and its alkali metal and ammonium salts, acryloyloxyethylphosphonic acid and its ammonium and alkali metal salts, and also the corresponding methacrylic acid derivatives, olefinically unsaturated amines, ammonium salts, nitriles, and amides, such as dimethylaminoethyl acrylate, acryloyloxyethyltrimethylammonium halides, acrylonitrile, acrylamide, methacrylamide, N-methylacrylamide, N-ethylacrylamide, N-propylacrylamide, N-methylolacrylamide, and also the corresponding methacrylic acid derivatives, and vinylmethylacetamide.

Customary additives, component (D), may be as follows: pigments, with the term "pigments" referring both to pigments and to fillers in the wider sense, and auxiliaries. Auxiliaries may among others be wetting and dispersing agents, defoamers, biocides, coalescents, alkali, and rheological additives.

Suitable pigments are finely divided organic or inorganic white or chromatic pigments or a mixture of various such pigments.

An exemplary selection of particularly preferred organic pigments here includes carbon black pigments, such as gas blacks or furnace blacks, for example; monoazo and disazo pigments, more particularly the Color Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; β-naphthol and Naphthol AS pigments, more particularly the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 254, Pigment Red 256, Pigment Orange 5, Pigment Orange 38 or Pigment Brown 1; laked azo and metal complex pigments, more particularly the Colour Index pigments Pigment Red 48:2, Pigment Red 48:3, Pigment Red 48:4, Pigment Red 57:1, Pigment Red257, Pigment Orange 68 or Pigment Orange 70; benzimidazoline pigments, more particularly the Colour Index pigments Pigment Yellow 120, Pigment Yellow 151, Pigment Yellow 154, Pigment Yellow 175 Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, more particularly the Colour Index pigments Pigment Yellow 139 or Pigment Yellow 173; phthalocyanine pigments, more particularly the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7 or Pigment Green 36; anthanthrone, anthraquinone, quinacridone, dioxazine, indanthrone, perylene, perinone, and thioindigo pigments, more particularly the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23 or Pigment Orange 43; triarylcarbonium pigments, more particularly the Colour Index pigments Pigment Red 169, Pigment Blue 56 or Pigment Blue 61.

Examples of suitable inorganic pigments are titanium dioxides, zinc sulfides, zinc oxides, iron oxides, magnetites, manganese iron oxides, chromium oxides, ultramarine, nickel or chromium antimony titanium oxides, manganese titanium rutiles, cobalt oxides, mixed oxides of cobalt and aluminum, rutile mixed phase pigments, sulfides of the rare earths, spinels of cobalt with nickel and zinc, spinels based on iron and chromium with copper zinc and also manganese, bismuth vanadates, and also extender pigments, use being made more particularly of the Color Index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33, and Pigment White 6; also, calcium carbonates referred to as fillers, such as naturally occurring chalk and precipitated calcium carbonate, dolomite, natural silicon dioxide (finely ground quartz), fumed and precipitated silicas, kieselguhr, aluminum oxides, aluminum hydroxides, talc, kaolin, mica (potassium aluminum silicate hydrate), barium sulfates such as naturally occurring barytes, and precipitated blanc Fixe. Preference is also given frequently to using mixtures of inorganic pigments. Mixtures of organic with inorganic pigments are likewise frequently used.

Suitable wetting agents and dispersants are preferably polyacrylate salts, acrylate copolymers and MAA copolymers, alkylphenol ethoxylates and alkylphenol ethoxylates substituents, such as Guerbet derivatives, fatty acid and fatty alcohol derivatives, especially their alkoxylates, and also EO/PO homopolymers and block copolymers, and polysiloxane ethers.

Suitable defoamers are preferably mineral oil defoamers and emulsions thereof, silicone oil defoamers and silicone oil emulsions, polyalkylene glycols, polyalkylene glycol fatty acid esters, fatty acids, alcohols of relatively high hydricity, phosphoric esters, hydrophobically modified silica, aluminum tristearate, polyethylene waxes, and amide waxes.

Suitable biocides for preventing the uncontrolled multiplication of bacteria, algae, and fungi are formaldehyde, formaldehyde donor compounds, methylisothiazolinone, chloromethylisothiazolinone, benzisothiazolinone, bronopol, dibromodicyanonebutane, and titanium dioxide coated with silver chloride.

Suitable coalescents are esters and ketones such as benzoates and butyrates, and also ether alcohols and glycols. In particular, 2,2,4-trimethylpentane-1,3-diol monoisobutyrate, butyl glycol, butyl diglycol, butyl dipropylene glycol, propylene glycol butyl ether, and dipropylene glycol butyl ether are noteworthy coalescents.

Suitable alkalis are metal hydroxides of mono-, di- or trivalent metal ions. Preferred alkalis are sodium hydroxide or potassium hydroxide and also their aqueous solutions.

Suitable rheological additives, as agents for regulating the viscosity, are, for example, starch derivatives and cellulose derivatives and hydrophobically modified ethoxylated urethane (HEUR) thickeners, alkali-swellable acrylate thickeners, hydrophobically modified acrylate thickeners, xanthans, phyllosilicates, polymers of acrylamidomethylpropanesulfonic acid, or fumed silica.

An overview of common auxiliaries is given by Wernfried Heilen et al. in "Additive für wässrige Lacksysteme", published by Vincentz Network, 2009.

Water, component (E), used for preparing the silicatic coating of the invention, is used preferably in the form of distilled or demineralized water. Drinking water (mains water) and/or water of natural origin can also be used.

In one preferred embodiment of the invention, component (A) is included in an amount from 0.01 to 10 wt %, more particularly 0.02 to 5.0 wt %, in the composition of the invention.

In one preferred embodiment of the invention, component (B) is included in an amount from 0.01 to 40 wt %, more particularly 0.5 to 25 wt %, in the composition of the invention.

In one preferred embodiment of the invention, component (C) is included in an amount from 0.01 to 70 wt %, more particularly 0.5 to 50 wt %, in the composition of the invention.

Where the composition of the invention comprises one or more constituents which can be subsumed under component (D), the following are preferred amounts of such constituents:

white or chromatic pigment in an amount from 10 to 70 wt %
wetting agents or dispersants in an amount from 0.01 to 10 wt %
defoamers in an amount from 0.01 to 5 wt %
biocides in an amount from 0.01 to 5 wt %
coalescents in an amount from 0.01 to 5 wt %.
rheological additives in an amount from 0.1 to 10 wt %.
alkalis in an amount from 0.01 to 10 wt %.

In one preferred embodiment of the invention, component (E) is included in an amount from 1 to 80 wt %, more particularly ad 100 wt %, in the composition of the invention.

Data in weight percentages are based on the total weight of the coating composition.

In a further preferred form, component (A), compound of the formula (I), is combined with a quaternary ammonium compound. In one preferred form, the quaternary ammonium compound is a compound of the formula (II a) or (II b),

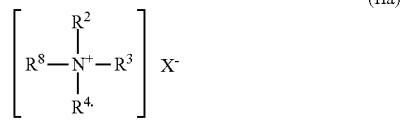
(IIa)

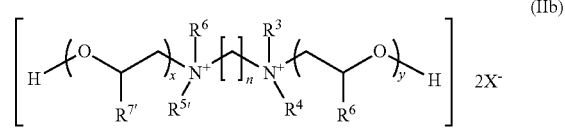
(IIb)

in which
$R^3$, $R^4$, $R^5$, and $R^8$ independently of one another are $C_1$-$C_6$ alkyl;
$R^2$ is $C_1$-$C_2$ alkyl, $CH_2CH_2OH$ or $CH_2CH(CH_3)OH$;
$R^6$ and $R^7$ are H or $C_1$-$C_4$ alkyl; and n, x and y independently of one another are a number between 1 and 10.
X is an anion selected from the group of the halides, nitrides, nitrates, carbonates, phosphates, phosphonates, hydroxides, sulfates or sulfonates.

In one particularly preferred form, the compounds of the formulae (I) and (II) are used in a ratio of 0.5:1 to 1:0.5. In one particularly preferred form, the ratio of compounds of the formulae (I) and (II) is between 0.75:1 to 1:0.75.

The silicatic coatings of the invention are suitable for producing coatings of all kinds. In particular the silicatic coatings of the invention are suitable for producing silicate, dispersion-based silicate, and organosilicate paints and renders for interior and exterior, and also molding compounds, adhesives, and filling compounds.

A further subject of the invention is the use of the compound of the formula (I) as a stabilizer for silicate, dispersion-based silicate, and organosilicate paints and renders for interior and exterior, and also molding compounds, adhesives, and filling compounds.

EXAMPLES

Percentages in this description are weight percentages based on the weight of the overall composition, unless otherwise specified.

In a comparison series, the nitrogen-containing compounds of table 1 were investigated in silicatic coatings for their effects on the rheology. The viscosity and change in viscosity over the storage time show the extent of the thickening. The yield point and the thixotropy area show the force required to render the silicatic coating flowable, in order to allow uniform application of the paint. The change over the storage time shows how quickly the thixotropy is reestablished and so prevents uniform leveling.

The rheological measurements were conducted on a HAAKE MARS III rheometer (Thermo Scientific). A solvent trap filled with water and sample-space cover were used for each measurement.

The viscosity was measured using a cone/plate geometry (1° 60 mm) at 20° C. A rotation ramp with shear rate specification between 1 and 200 $s^{-1}$ was measured, and the viscosity value was read off at a shear rate of 60 $s^{-1}$.

The thixotropy was determined via the evaluation of the hysteresis area between upward and downward rotation ramps with shear rate specification between 0.1 and 1000 $s^{-1}$. The measurements were carried out with a cone/plate geometry (1° 60 mm) at 23° C.

Before the determination of the yield point, the sample was applied to the measuring plate, sheared at 0.1 $s^{-1}$ for 5 minutes, and left to stand for 5 minutes (structure recovery phase). Then a rotation ramp with shear stress specification between 0.01 and 80 Pa was carried out. The yield point was determined by the tangent method in a double-logarithmic plot of the measurement curve. The measurements were carried out with a plate/plate geometry (35 mm-gap 1 mm) at 23° C.

TABLE 1

| Stabilizers used | | |
|---|---|---|
| Stabilizer | Description | Type of example |
| N,N,N',N'-Tetrahydroxyalkyl-α-ω-alkylamine | Tertiary diamine compound Betolin® Q 40, Wöllner | Comparative example |

TABLE 1-continued

Stabilizers used

| Stabilizer | Description | Type of example |
|---|---|---|
| N-Methylglucamine | Compound I with $R^1$ = H | Inventive example |
| N,N-Dimethylglucamine | Compound I with $R^1$ = $CH_3$ | Inventive example |

TABLE 2

Composition of the silicate paints in wt %

| Item | Raw material | Function | wt % |
|---|---|---|---|
| 1 | Water | Solvent | 24.5 |
| 2 | Tylose H 30.000 P2 | Cellulose thickener | 0.4 |
| 3 | Sapetin D27 | Wetting agent | 0.2 |
| 4 | DispersogenSPS | Stabilizer (quaternary ammonium compound) | 1 |
| 5 | Agitan E 256 | Defoamer | 0.15 |
| 6 | Tiona 595 | White pigment | 10 |
| 7 | Finntalc M30SL | Filler | 5 |
| 8 | Omyacarb 2 GU | Filler | 10 |
| 9 | Omyacarb 5 GU | Filler | 16 |
| 10 | Omyacarb extra GU | Filler | 3.7 |
| 11 | Water | Solvent | 1 |
| 12 | Mowilith LDM 6119 | Binder | 9 |
| 13 | Water | Solvent | 1 |
| 14 | Silres BS 1306 | Silicone oil | 0.65 |
| 15 | Betolin K28 | Alkali | 16 |
| 16 | Stabilizer as per table 1 | Stabilizer | 0.2 |
| 17 | Water | Solvent | 0.2 |
| 18 | Agitan E 256 | Defoamer | 0.15 |
| 19 | Water | Solvent | 0.85 |
| | Total | | 100 |

A silicate paint was formulated in accordance with table 2. For this purpose, components 1-5 were homogenized at room temperature by successive addition at 100 to 300 rpm by means of a Getzmann dissolver with sawtooth stirrer. Components 6-10 were subsequently dispersed at a high shear rate (1000-1300 rpm). Finally, components 11 to 19 were added in succession and homogenized at 1300 rpm.

The properties of the silicate paint of table 2, when additized with a stabilizer as per table 1, are shown in table 3.

TABLE 3

Examples 1 (C) to 3 in silicate paint

| Example | 1 (C) | 2 | 3 |
|---|---|---|---|
| Stabilizer | N,N,N',N'-Tetrahydroxyalkyl-α-ω-alkylamine | N-Methyl-glucamine | N,N-Dimethyl-glucamine |
| Viscosity after 24 h storage at room temperature | 622 mPas | 420 mPas | 401 mPas |
| Viscosity after 28 days' storage at room temperature | 2186 mPas | 970 mPas | 873 mPas |
| pH | 11 | 11 | 11 |
| Yield point after 24 h storage at room temperature | 3.4 Pa | <1 Pa | 2.6 Pa |
| Yield point after 28 days' storage at room temperature | 11 Pa | 2.7 Pa | 8.0 Pa |

TABLE 3-continued

Examples 1 (C) to 3 in silicate paint

| Example | 1 (C) | 2 | 3 |
|---|---|---|---|
| Thixotropy area after 7 days' storage at room temperature | 21.7 kPa/s | 4.4 kPa/s | 4.5 kPa/s |
| Thixotropy area after 28 days' storage at room temperature | 41.9 kPa/s | 15.4 kPa/s | 11.8 kPa/s |

Table 3, example 1 (C) shows a higher viscosity and a greater rise in viscosity relative to the invention (examples 2 & 3). The smaller thixotropy area and yield point of examples 2 and 3 points to easier working with the silicate paints.

TABLE 4

Composition of the organosilicate paints in wt %

| Item | Raw material | Function | wt % |
|---|---|---|---|
| 1 | Water | Solvent | 20 |
| 2 | Tafigel FUR 40 | PU thickener | 0.3 |
| 3 | Tylose MH 6000 YG8 | Cellulose thickener | 0.08 |
| 4 | Lopon 890 | Wetting agent | 0.3 |
| 5 | Dispersogen SPS | Stabilizer (quaternary ammonium compound) | 0.16 |
| 6 | Agitan E 256 | Defoamer | 0.4 |
| 7 | Wükonil HB 3000 | Wax | 2 |
| 8 | Tiona 595 | White pigment | 17.5 |
| 9 | Finntalc M30SL | Filler | 5 |
| 10 | Omyacarb 2 GU | Filler | 8.5 |
| 11 | Omyacarb 5 GU | Filler | 6.5 |
| 12 | Omyacarb extra GU | Filler | 12 |
| 13 | Water | Solvent | 1 |
| 14 | Mowilith LDM 1828 | Binder | 17 |
| 15 | Water | Solvent | 1 |
| 16 | Tafigel FUR 44 | PU thickener | 0.5 |
| 17 | Potassium hydroxide solution (10% strength) | Alkali | 1 |
| 18 | Betolin K28 | Waterglass | 3.5 |
| 19 | Stabilizer as per table 1 | Stabilizer | 0.2 |
| 20 | Water | Solvent | 0.2 |
| 21 | Agitan E 256 | Defoamer | 0.15 |
| 22 | Water | Solvent | 1.67 |
| | Total | | 100 |

An organosilicate paint was formulated in accordance with table 4. For this purpose, components 1-7 were homogenized at room temperature by successive addition at 100 to 300 rpm by means of a Getzmann dissolver with sawtooth stirrer. Components 8-13 were subsequently dispersed at a high shear rate (1000-1300 rpm). Finally, components 14 to 22 were added in succession and homogenized at 1300 rpm.

The properties of the organosilicate paint of table 4, when additized with a stabilizer as per table 1, are shown in table 5.

TABLE 5

Examples 4 (C) to 6 in organosilicate paint

| Example | 4 (C) | 5 | 6 |
|---|---|---|---|
| Stabilizer | N,N,N',N'-Tetrahydroxyalkyl-α-ω-alkylamine | N-Methyl-glucamine | N,N-Dimethyl-glucamine |
| Viscosity after 24 h storage at room temperature | 1441 mPas | 838 mPas | 832 mPas |
| Viscosity after 28 days' storage at room temperature | 2855 mPas | 1567 mPas | 1463 mPas |
| pH | 11 | 11 | 11 |
| Yield point after 24 h storage at room temperature | 5 Pa | 1 Pa | 4 Pa |
| Yield point after 28 days' storage at room temperature | 9 Pa | 5 Pa | 6 Pa |
| Thixotropy area after 7 days' storage at room temperature | 36 kPa/s | 33 kPas/s | 28 kPas/s |
| Thixotropy area after 28 days' storage at room temperature | 57 kPa/s | 48 kPa/s | 42 kPa/s |

Table 5, example 4 (C) shows a higher viscosity and a greater rise in viscosity relative to the invention (examples 5 & 6). The smaller thixotropy area and yield point of examples 5 and 6 points to easier working with the organosilicate paints.

What is claimed is:

1. A dispersion comprising
(A) at least one compound of the formula (I)

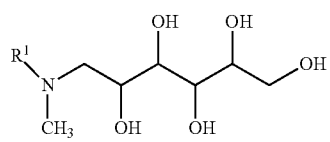

in which $R^1$ is $C_1$-$C_4$ alkyl, $CH_2CH_2OH$ or $CH_2CH(CH_3)OH$,
(B) at least one silicate binder,
(C) at least one polymeric binder,
and
(E) water.

2. The dispersion as claimed in claim 1, further comprising as component (D) one or more of the constituents selected from the group consisting of pigments, dispersants, defoamers, coalescents, rheological additives, biocides, wetting agents, and alkalis.

3. The dispersion as claimed in claim 1, wherein $R^1$ is methyl or $CH_2CH_2OH$.

4. The dispersion as claimed in claim 1, wherein $R^1$ is methyl.

5. The dispersion as claimed in claim 1, wherein the concentration of the compound of the formula (I) is 0.01 to 10 wt %.

6. The dispersion as claimed in claim 1, wherein the concentration of the compound of the formula (I) is 0.02% to 5%.

7. The dispersion as claimed in claim 1, which comprises a quaternary ammonium compound.

8. The dispersion as claimed in claim 7, in which the quaternary ammonium compound is selected from the group consisting of compounds of the formulae (II a) and (II b)

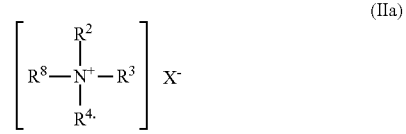

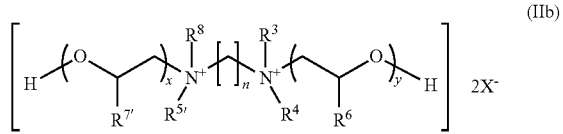

in which
$R^3$, $R^4$, $R^5$, and $R^8$ independently of one another are $C_1$-$C_6$ alkyl;
$R^2$ is $C_1$-$C_2$ alkyl, $CH_2CH_2OH$ or $CH_2CH(CH_3)OH$;
$R^6$ and $R^7$ independently of one another are H or $C_1$-$C_4$ alkyl;
n, x and y independently of one another are a number between 1 and 10, and
X is an anion selected from the group consisting of halides, nitrites, nitrates, carbonates, phosphates, phosphonates, hydroxides, sulfates and sulfonates.

9. The dispersion as claimed in claim 8, in which the compounds of the formula (I) and (II) are used in a ratio of 0.5:1 to 1:0.5.

10. The dispersion as claimed in claim 8, in which the compounds of the formula (I) and (II) are used in a ratio of 0.75:1 to 1:0.75.

11. The dispersion as claimed in claim 1, further comprising a white or chromatic pigment in an amount from 10 to 70 wt %.

12. The dispersion as claimed in claim 1, further comprising wetting agents or dispersants in an amount from 0.01 to 10 wt %.

13. The dispersion as claimed in claim 1, further comprising defoamers in an amount from 0.01 to 5 wt %.

14. The dispersion as claimed in claim 1, further comprising biocides in an amount from 0.01 to 5 wt %.

15. The dispersion as claimed in claim 1, further comprising coalescents in an amount from 0.01 to 5 wt %.

16. The dispersion as claimed in claim 1, further comprising rheological additives in an amount from 0.1 to 10 wt %.

17. The dispersion as claimed in claim 1, comprising the polymeric binder (C) in an amount from 0.01 to 70 wt %.

18. The dispersion as claimed in claim 1, comprising the polymeric binder (C) in an amount from 0.5 to 50 wt %.

19. The dispersion as claimed in claim 1, further comprising alkali in an amount from 0.01 to 10 wt %.

20. The dispersion as claimed in claim 1, comprising 0.1 to 40 wt % of constituent (B).

21. The dispersion as claimed in claim 1, comprising 0.5 to 25 wt % of constituent (B).

22. The dispersion as claimed in claim 1, comprising 1 to 80 wt % of water.

23. The dispersion as claimed in claim 1, in which the compound of formula (I) is prepared from glucose.

24. A method for stabilizing silicatic coating which comprises at least one silicate binder, at least one polymeric binder, and water, comprising the step of adding at least one compound of the formula (I)

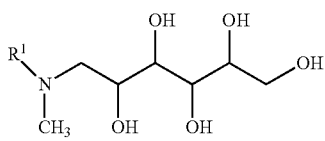 (I)

in which $R^1$ is $C_1$-$C_4$, alkyl, $CH_2CH_2OH$ or $CH_2CH(CH_3)OH$ to the silicatic coating.

25. The method as claimed in claim 24, in which the compound of the formula (I) is combined with at least one quaternary ammonium compound.

26. The method as claimed in claim 25, in which the quaternary ammonium compound corresponds to the formula (II a) and/or (II b)

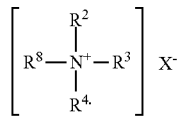 (IIa)

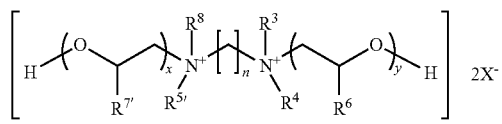 (IIb)

in which
$R^3$, $R^4$, $R^5$, and $R^8$ independently of one another are $C_1$-$C_6$ alkyl;
$R^2$ is $C_1$-$C_2$ alkyl, $CH_2CH_2OH$ or $CH_2CH(CH_3)OH$;
$R^6$ and $R^7$ independently of one another are H or $C_1$-$C_4$ alkyl;
n, x and y independently of one another are a number between 1 and 10, and
X is an anion selected from the group consisting of halides, nitrites, nitrates, carbonates, phosphates, phosphonates, hydroxides, sulfates and sulfonates.

27. The method as claimed in claim 26, in which the compounds of the formula (I) and (II) are used in a ratio of 0.5:1 to 1:0.5.

28. The method as claimed in claim 26, in which the compounds of the formula (I) and (II) are used in a ratio of 0.75:1 to 1:0.75.

* * * * *